US006797353B1

(12) United States Patent
Pacione

(10) Patent No.: US 6,797,353 B1
(45) **Date of Patent: *Sep. 28, 2004**

(54) COVERING MODULE AND ANCHOR SHEET

(75) Inventor: Joseph R. Pacione, Thornhill (CA)

(73) Assignee: Tac-Fast Georgia, L.L.C., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/703,901

(22) Filed: Nov. 2, 2000

Related U.S. Application Data

(63) Continuation of application No. 08/850,726, filed on May 2, 1997, now Pat. No. 6,306,477, which is a continuation-in-part of application No. 08/684,004, filed on Jul. 19, 1996, now abandoned.

(51) Int. Cl.[7] .......................... A47G 27/04; B23B 3/02; B23B 3/06; B23B 7/06

(52) U.S. Cl. ............................ 428/62; 428/82; 428/88; 428/95; 428/100; 52/311.2; 52/506.05; 52/511; 52/578; 52/DIG. 13

(58) Field of Search ................................ 52/311.2, 385, 52/386, 387, 391, 506.05, 571, 582.1, 698, 745.06, 746.1, 746.12, 747.1, 747.11, DIG. 13, 511; 428/45, 58, 60, 62, 88, 95, 100

(56) References Cited

U.S. PATENT DOCUMENTS

| | | | |
|---|---|---|---|
| 748,746 A | 1/1904 | Kelsey | |
| 2,012,929 A | 8/1935 | Knowland | |
| 3,002,868 A | 10/1961 | Boivin | |
| 3,247,638 A | 4/1966 | S. Gay, Jr. | |
| 3,522,637 A | 8/1970 | Brumlik | |
| 3,574,019 A | 4/1971 | Girard | |
| 3,708,833 A | 1/1973 | Ribich et al. | |
| 3,735,988 A | 5/1973 | Palmer et al. | |
| 3,775,856 A | 12/1973 | Schmidt | |
| 3,817,015 A | 6/1974 | Frangos | |
| 3,866,267 A | 2/1975 | Poletti | |
| 4,405,668 A | 9/1983 | Wald | |
| 4,489,115 A | * 12/1984 | Layman et al. | 428/62 |
| 4,528,783 A | 7/1985 | Muir | |

(List continued on next page.)

FOREIGN PATENT DOCUMENTS

| | | |
|---|---|---|
| AU | 40926/72 | 10/1973 |
| BE | 853033 | 7/1997 |
| DE | 7029524 | 11/1970 |
| DE | 2012523 | 2/1972 |
| DE | 2201231 | 7/1973 |
| DE | 2803006 | 8/1979 |
| DE | 4228597 | 3/1994 |
| DE | 19532685 | 3/1997 |
| DE | 197 24 698 | 12/1998 |
| FR | 2328432 | 5/1977 |
| FR | 2362257 | 3/1978 |
| FR | 2582210 | 11/1986 |
| FR | 2747605 | 10/1997 |
| GB | 1204886 | 9/1970 |
| GB | 1376262 | 12/1974 |
| GB | 1546901 | 5/1979 |
| JP | 53-74719 | 7/1978 |
| JP | 59-81479 | 6/1984 |
| JP | 10-118988 | 5/1998 |
| WO | WO86/01247 | 2/1986 |
| WO | WO95/03723 | 2/1995 |
| WO | WO98/03104 | 1/1998 |

*Primary Examiner*—Robert Canfield
(74) *Attorney, Agent, or Firm*—Brian W. Gray

(57) ABSTRACT

This application discloses a relatively thin flexible anchor sheet for installation under carpets or other decorative coverings and a covering module composed of a pre-attached decorative covering and anchor sheet which can be assembled by overlapping hook and loop attachment to an additional covering module to create a complete floor covering of carpet, tile, stone or other material and without attachment to a floor.

11 Claims, 17 Drawing Sheets

U.S. PATENT DOCUMENTS 4,557,774 A 12/1985 Hoopengardner
4,649,069 A * 3/1987 Tone ........................... 428/82
4,671,976 A 6/1987 Vidal
4,673,603 A 6/1987 Roth
4,755,401 A 7/1988 Friedrich et al.
4,766,022 A * 8/1988 Tone ........................... 428/95
4,769,895 A 9/1988 Parkins
4,770,917 A 9/1988 Tochacek et al.
4,810,546 A 3/1989 McLaughlin
4,822,658 A 4/1989 Pacione
4,824,498 A 4/1989 Goodwin et al.
4,825,477 A 5/1989 Aranda
4,829,627 A 5/1989 Altus et al.
4,968,548 A 11/1990 Gibson et al.
4,974,384 A * 12/1990 Pacione ....................... 52/483
5,042,221 A 8/1991 Pacione
5,045,389 A * 9/1991 Campagna ............... 428/316.6
5,060,443 A 10/1991 Pacione
5,116,439 A 5/1992 Raus
5,133,166 A 7/1992 Pacione
5,144,786 A 9/1992 Pacione
5,149,573 A 9/1992 Kobe et al.
5,191,692 A 3/1993 Pacione
5,200,245 A 4/1993 Broderick, Jr.
5,259,163 A 11/1993 Pacione
5,382,462 A * 1/1995 Pacione ....................... 428/95
5,386,670 A 2/1995 Takeda
5,479,755 A 1/1996 Pacione
5,482,755 A 1/1996 Manning
5,529,825 A 6/1996 Sutherland
5,537,793 A 7/1996 Murasaki
5,654,066 A 8/1997 Pacione
5,672,404 A 9/1997 Callahan, Jr. et al.
5,691,026 A * 11/1997 Zinke et al. ................ 428/100
5,691,027 A 11/1997 Eckhardt et al.
5,723,195 A 3/1998 Pacione
5,753,336 A * 5/1998 Stull ........................... 428/86
5,832,619 A 11/1998 Volkema, Jr.
5,863,637 A 1/1999 Mansson et al.
5,879,777 A 3/1999 Shipley
5,902,663 A 5/1999 Justesen et al.
5,965,232 A 10/1999 Vinod
6,083,596 A 7/2000 Pacione
6,182,414 B1 2/2001 Huang
6,217,974 B1 4/2001 Pacione
6,250,001 B1 6/2001 Gillespie
6,298,624 B1 * 10/2001 Pacione ....................... 52/511
6,306,477 B1 * 10/2001 Pacione ....................... 428/62
6,395,362 B1 5/2002 Pacione

* cited by examiner

COVERING MODULE AND ANCHOR SHEET

RELATED APPLICATION

This application is a continuation application of U.S. patent application Ser. No. 08/850,726 filed on May 2, 1997, which issued as U.S. Pat. No. 6,306,477 on Oct. 23, 2001, which application is a continuation-in-part application of U.S. patent application Ser. No. 08/684,004 filed on Jul. 19, 1996, now abandoned.

FIELD OF THE INVENTION

This invention concerns a relatively thin flexible anchor sheet for use under carpets or other decorative coverings. In practice, when installed, the anchor sheet acts to tie the decorative covering together as a functional unit and to add mass and stability to such unit, particularly a unit having a flexible decorative covering such as a carpet. An anchor sheet may be substantially covered over one side with hooks for anchoring a decorative covering to it by engagement of complementary loops on the lower side of the covering. The anchor sheet itself may be attached to the underlying substrate, such as a floor or wall, or it may be loose laid on a floor where the sheet and covering together have sufficient mass or are so placed as to prevent movement. It is possible to supply the anchor sheet as a small or large module with pre-attached decorative covering as will be explained later.

BACKGROUND OF THE INVENTION

It is common to attach a decorative flexible covering, such as carpets, to rigid substrates such as floors, made of wood or concrete. It is often desirable, or even required, to fasten carpet to the flooring which it covers and a variety of attachment methods have been developed over the years.

Carpet can be glued directly to the flooring. This is often the approach taken in an institutional setting in which the underlying flooring is concrete and liquid glue is applied across the entire concrete area to be covered. This approach has the advantage that, so long as the adhesive bond provided between the carpet and flooring remains intact, the carpet cannot buckle. Of course, adjustment or replacement of such carpet can be difficult in the sense that previously applied glue might be required to be stripped from the flooring and new glue applied. In addition, such glues often contain volatile organic components that are banned in some places or are required to be ventilated, in other places.

Another approach taken to installing wall-to-wall carpet involves the use of "tackless strips", which are wooden strips having angled tacks driven upwardly therethrough. The strips are secured around the perimeter of the area to be covered, often by nailing them into wooden flooring, and the carpet is stretched over the tacks. This approach has the advantage that the carpet can be restretched to remove a buckle that develops, and the carpet and underpad, not being permanently adhered to the flooring can be removed without being destroyed. However, stretching is a labour intensive art which makes installing wall-to-wall carpet by this method relatively expensive. This approach also avoids the use of volatile organics, but some difficulties can arise in installing tackless strips to concrete.

More recent approaches involving the use of Velcro-type fasteners have been described in the patent literature: Germany 7,029,524 (Aug. 8, 1970, Velcro France), U.S. Pat. No. 3,574,019 (Apr. 6, 1971, Girard); UK 1,546,901 (May 31, 1979, Allied Chemical Corporation); U.S. Pat. No. 4,822,658 (Apr. 18, 1989, Pacione); U.S. Pat. No. 5,191,692 (Mar. 9, 1993, Pacione); U.S. Pat. No. 5,382,462 (Jan. 17, 1995, Pacione); and U.S. Pat. No. 5,479,755 (Jan. 2, 1996, Pacione). The specifications of all these patent documents are incorporated herein by reference.

U.S. '658 from the same inventor describes a wall-to-wall installation in which hooked strips are secured by pressure sensitive adhesive around a room perimeter and at the carpet seams. A carpet having loops across its backside is cut to fit the room and the loops engage the hooked tape. U.S. '692 describes a method for seaming a carpet such as the one described in U.S. '658. Both of these patent specifications also disclose advantages obtained through the use of a cover for the hooked tape, a primary advantage being that such a cover prevents premature engagement of the hooks and loops to permit proper placement and adjustment of the carpet without the need for disengaging prematurely engaged hooks and loops during installation. This prior approach provides the advantages of installing strips at the perimeter and seams of a carpeted area, particularly that the carpeting can be lifted without being destroyed and the avoidance of the use of compounds containing volatile adhesives.

The "holy grail" of carpet and other decorative covering, would be a system which when laid had such mass and stability as to require little or no attachment to the underlying substrate and which can be installed over existing substrates without the necessity of the removal of existing covering. However for transportation in trucks and to physically fit into a site, such as a room, such a system has to either provide for sufficient flexibility so that it can be rolled or, if rigid, a way of assembling modules so as to form a contiguous mass in situ with sufficient mass and stability to remain in place with minimal detachable attachment or perhaps no attachment, particularly when dealing with different existing floors or flooring surfaces to be covered.

SUMMARY OF THE INVENTION

As previously mentioned, there are advantages to allow the carpet or other decorative covering to be attached to an underlying undersurface at only a few discrete attachment points or even in some cases not attached at all so as to be easily removable. Attachment to the underlying substrate at discrete attachment points provides for minimal damage to the underlying substrate, ease of removal from the substrate and ease of installation. However, a product, method and system is needed to convert these individual attachment points to structurally integrated attachment across the entire undersurface of a carpet or other decorative covering to enable overlaying carpet or other decorative covering to be engineered to maintain atmospheric stability, flatness and horizontal plane stability when stressed with forces produced by human traffic, rolling vehicles, moving furniture or moisture or temperature changes.

In addition, the system provides that the pieces of carpet or other decorative covering can be integrated together by use of the underlying detachable anchor sheet. Then individual modules can be made consisting of a decorative covering and an anchor sheet attached together in advance of installation at a remote site. Such modules can be easily removed and re-attached as required for repair or replacement or for design reasons. In addition such individual modules can be locked together by overlapping the anchor sheet or decorative covering of adjacent modules so as to give the complete structure sufficient mass and stability to minimize or remove the need for attachment to the substrate.

The present invention in one aspect features an anchor sheet, preferably of plastic, for detachable attachment of a decorative covering such as carpet, ceramic, tile, hardwood, marble or a wall covering to an underlying rigid supporting substrate, such as the surface of flooring or a wall.

By providing an anchor sheet preferably in the form of a relatively thin flexible sheet, integrity can be given to covering materials, such as flexible carpets which can be pre-assembled or assembled on site onto the surface of the sheet by the use of a complementary hook on the upper surface of the flexible sheet matching a complementary loop on the undersurface of the carpet or carpet pieces. The sheet can then be installed onto an underlying substrate such as concrete or wood at only a discrete number of points. The anchor sheet enables the installation of decorative covering even onto stone or tile, without significant destruction of the stone or tile floor. It also enables decorative patterns to be pre-assembled at a factory or other location or to be assembled on site by cutting and fitting different colours or pieces of decorative covering together on the anchor sheet to form decorative patterns. Such a system is suitable for either area rugs or wall-to-wall covering and in certain types of wall-to-wall and area rugs, or even tile, it may not be necessary to attach the anchor sheet to the underlying substrate at all. If the carpet is cut to fit the walls or boundaries of a room the anchor sheet may give sufficient integrity to the carpet to allow it to simply sit in the location under constraint of the perimeter walls or other boundaries or if enough furniture, for example, was placed on top. It should be emphasized that the anchor sheet, however, is not structural support in the conventional sense as disclosed for example, in the anchor board of Pacione 5,060,443 since it does not support the floor or wall on which it is placed. It is a vehicle for stabilizing the carpet or other decorative covering which is overlaid and for tying individual pieces of carpet or decorative covering together with each other but not necessarily to the floor. Normally in fact the anchor sheet maintains a certain level of flexibility to enable the anchor sheet to "ride" over imperfections in the floor.

Normally the anchor sheet is relatively thin in relation to the overlying decorative covering, but in some cases, for instance, where there is a thin layer of marble veneer, then the anchor sheet could be thicker and more rigid than the overlying material and could be made of materials other than plastic such as metal (aluminum or steel) or wood.

Thus, the invention consists of, in one aspect, a detachable anchor sheet for detachable attachment of a decorative covering, such as a carpet, to a rigid supporting substrate, such as a floor, in which the decorative covering has a finished upper surface and an opposite surface substantially covered in loops. The anchor sheet can comprise a relatively thin flexible sheet, preferably of plastic such as a polycarbonate, polyester, polyethylene, or polypropylene, substantially covered with hooks on its upper surface facing the loop surface of the decorative covering and placed intermediate between the decorative covering and the supporting substrate. This flexible anchor sheet or sheets can be, but normally is not, exactly the same size as the combined pieces of overlying sheet goods. Normally overlapping areas of anchor sheet or decorative covering are used to enable tying of the anchor sheets used in a location together. The anchor sheet may be larger than the area under the sheet goods or it can be smaller in cases where it is desired to trim the overlaying carpet to a wall or other boundary. The anchor sheet and decorative covering must in combination have sufficient rigidity to support the decorative covering from shear horizontal force applied to the sheet goods on the floor or other substrate when the combination is laid onto the rigid supporting substrate. In some cases, the anchor sheet will be attached to the substrate at a limited number of discrete points or in some cases along with the covering it may have sufficient rigidity and mass to free float within the boundaries of a room or even on its own.

Thus, in another aspect of this invention it is possible to install decorative flexible anchor sheets to abut each other and to use either the hook covering of the anchor sheet or the overlying decorative covering such as a carpet to tie the abutting anchor sheets together with the use of complementary hook and loop technology. In almost all cases the overlying covering will overlap the joins of the anchor sheets and the anchor sheets will overlap the joins of the covering to tie the anchor sheets and covering together.

It is preferable, but not required in all cases, for the decorative covering to be detachable from the anchor sheet. In the case of smaller modules the decorative covering would normally be pre-installed, and possibly even permanently installed, on the non-decorative anchor sheet leaving an area of anchor sheet or decorative covering exposed for detachable attachment by overlapping with adjoining modules. It is required that this overlapping area provide for detachable attachment and also for a means to prevent attachment during installation to enable the modules to be adjusted for correct alignment during installation. The means for detachable attachment is preferably a hook and loop attachment system, but it could also be an adhesive which provided for multiple opening and closing while maintaining tackiness. In the case where hook and loop is used to join the modules, the covering could be a hand smooth plastic which does not bind to the hook and loop, or one could use a textile or paper hook covering not unlike the hook covering in original patent Pacione '658. For parquet, tile, hardwood, ceramics or other rigid decorative covering, a flexible tape covering could be used in the overlapping area, which is provided with a pull string which can be pulled from under the pre-assembled covering. This whole process could be duplicated using entirely adhesive or part adhesive and part hook and loop.

Thus, the individual modules of anchor sheet and the individual modules of covering are tied together in a supporting mass which can "free float" on the floor or be connected at only very few discrete points.

In another aspect the invention consists of an anchor sheet or sheets and pieces of covering in an overlapping staggered relationship to form a contiguous floor covering having sufficient rigidity, atmospheric stability, horizontal plane stability (shear force stability) and flexibility so that in general use such floor covering may not require attachment to the underlying floor. Attachment may be required for a small area rug over a slick marble floor or at a ramp or stairs or where the end use involves heavy traffic.

In another aspect of this invention, decorative modules comprising an anchor sheet and decorative covering can be pre-assembled off site by detachably attaching some of the hooks on the upper surface of the anchor sheet to some of the loops on the underside of the decorative covering so that the decorative covering on the anchor sheet overlaps the anchor sheet by a predetermined amount. These pre-assembled decorative modules can then be shipped to the site and individually placed on the underlying substrate in an abutting fashion to permit interlocking between the loops on the underside of the decorative covering of one unit and the hooks on the upper surface of the anchor sheet of an adjacent decorative module. Each decorative module added to the growing modular surface covering can be guided into its proper position by placing thin, rigid pieces of plastic over the exposed hooks of the anchor sheet of an established decorative module. After properly aligning the decorative module to be added to the established module, the thin, rigid plastic pieces are slid out and away from the two modules, parallel to the horizontal plane, thereby allowing the abutting module to become engaged through a hook and loop system. The thin, rigid pieces of plastic can also be used to detach individual modules of the modular surface covering. The thin, rigid plastic is inserted between the mechanically bonded portions of the hook and loop fastener of abutting modules, parallel to the horizontal plane, thereby breaking the mechanical bond and maintaining the hooks and loops out of contact with one another to enable the units to be dislodged and removed from the modular surface covering.

In another aspect, the invention consists of a covering module for transportation to a surface to be covered and for attachment to additional modules to form a finished decorative surface comprising at least one decorative covering having an upper decorative surface and an opposite lower surface, a non-decorative anchor sheet having an upper surface, the decorative covering attached across a substantial portion of its lower surface to the non-decorative anchor sheet and the anchor sheet dimensioned so that, after attachment of the decorative covering to the anchor sheet, there is provided an overlap area of upper surface of anchor sheet exposed along at least one edge of the module which overlap area is provided with means for detachable attachment of such module to an adjoining module by attachment to an overlapping area of the lower surface of a decorative covering attached to an adjoining module.

Covering modules of an unlimited variety of shapes and sizes can be constructed and decorative patterns may be assembled on site by combining different colours or patterns of the same type of decorative covering, such as alternating between units of red and blue carpet or by combining different types of decorative covering such as carpet and hardwood in a hotel, restaurant or ballroom setting or carpet, hardwood, ceramic or stone in a home setting. In general use, such contiguous covering could have sufficient rigidity and mass so as not to require attachment to the underlying surface. In some cases, attachment of the anchor sheet at discrete points may be required as for example, when the surface to be covered is a wall.

BRIEF DESCRIPTION OF THE DRAWINGS

Embodiments of the invention will now be described, reference being had to the accompanying drawings, wherein.

DESCRIPTION OF PREFERRED EMBODIMENTS

Figure 1:
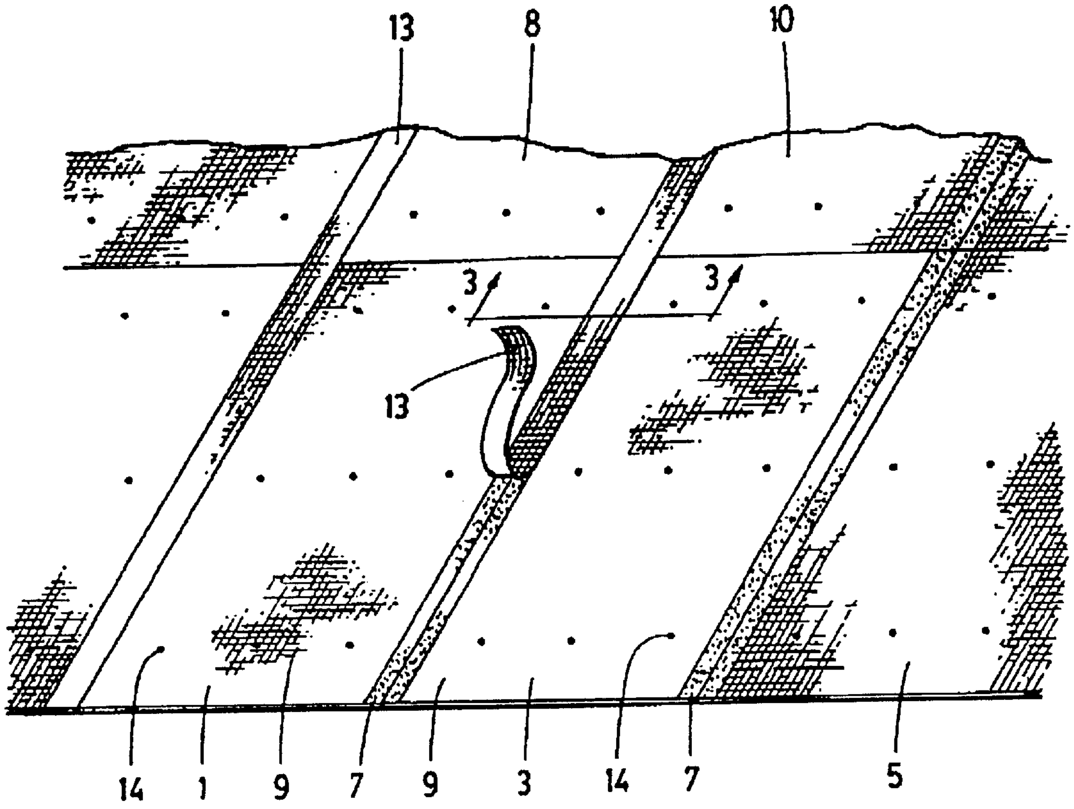
FIG. 1 shows anchor sheets of a first embodiment of the system of the invention laid side by side on a floor with a temporary hook covering bridging the abutting joins to tie the sheets together.
Figure 2:
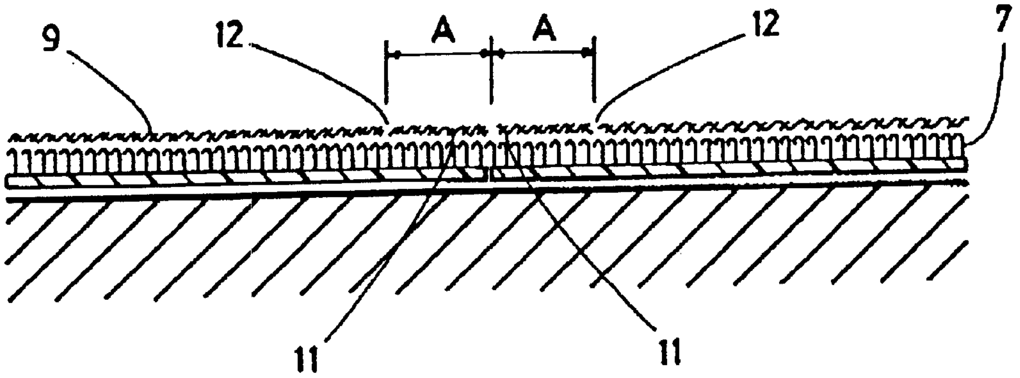
FIG. 2 shows a section of anchor sheet laid onto a floor with the sheet covered with separate detachable hook cover pieces A—A at a boundary.
Figure 3:
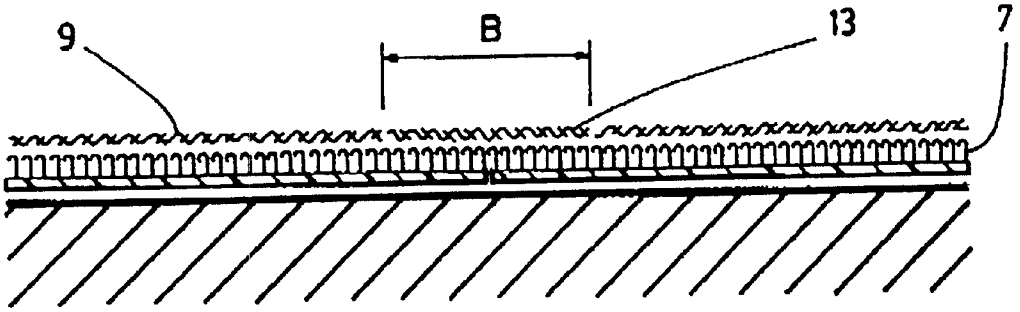
FIG. 3 shows a section along the lines 3—3 in FIG. 1 with a connecting hook cover piece.

Turning to the drawings, a first embodiment anchor sheet 1 is illustrated in FIG. 1 having abutting anchor sheets 3 and 5. Each anchor sheet is covered with plastic or filament hooks 7 which can be better seen in FIGS. 2 and 3 similar to hooks currently used on conventional hook and loop fastening systems. Covering pieces 9, preferably of cloth, cover the hooks 7. The covering could also be a film. The covering can be better seen in FIGS. 2 and 3. In order to keep the hooks 7 clean and to prevent premature attachment of a to-be-installed overlying covering, this form of anchor sheet is completely covered with a covering. Preferably there is a separate covering strip 11 of a width A, as shown in FIG. 2, which establishes a pre-cut slit 12 in the covering of a width A along the border of each anchor sheet. While the anchor sheet can be provided in rolls as described later, in the embodiment of FIG. 1 it is simply a sheet, for instance, a rectangle of four feet by eight feet. It can be laid on the floor, in the case of a wall-to-wall installation, in continuous abutting relationship to other anchor sheets to cover the entire surface of the floor or other rigid substrate. As it is covered with coverings 9 and strips 11, it is possible to lay and install carpet on it without premature attachment of the hooks 7 and complementary loops. The carpet constructed, for instance, as disclosed in U.S. Pat. No. 4,822,658 (Pacione) can be installed onto this anchor sheet.

However when working on the anchor sheet with carpet, it may be preferable if the anchor sheets are at least anchored to each other and possibly pre-attached at discrete locations to the floor. Anchor sheets can be attached to each other by the removal of precut hook covering strips 11 on either piece of abutting anchor sheets for instance 1 and 3 and replacement of such hook covering with a bridging piece of hook covering for instance 13 which covers the join between abutting anchor sheets and attaches them to each other. Strip 13 can cover the join between a number of anchor sheets. For instance in FIG. 1, it is also covering the abutting join between anchor sheet 8 and 10 as well.

Anchor sheets can also be attached to the floor at discrete locations such as at point 14. The anchor sheet can be glued down, attached by hook tape affixed to the floor and attachable to complementary loops on the back of the anchor sheet, or attached by double-sided adhesive tape, but in most cases the simplest form of attachment of the anchor sheet to the rigid substrate, particularly if the substrate is, for example, a wooden floor, is to attach the anchor sheet at discrete points by the use of nails or tacks. Such discrete points are shown at 14 in FIG. 1 and in this case it is advisable to have perforations, slits or holes in hook cover sheet 9 so as to enable the anchor sheets such as 1, 3, 5 etc. to be nailed to the floor through the hook cover sheets 9 without the head of such nail or tack attaching the hook cover sheet 9 permanently to the anchor sheet 1, 3, 5 etc. so that such sheet can be removed after the overlying carpet has been cut and fit in place for attachment of the overlying carpet to the anchor sheet. In addition, depending on the thickness or brittleness of the anchor sheets, it may be advisable to have pre-drilled holes in the anchor sheets.

Depending upon the form of attachment, if any, of the anchor sheet to the floor, it may not be necessary to attach the anchor sheets to each other by the use of bridging hook cover 13 during installation of the carpet.

It may also be possible, depending upon where the underlying carpet joins occur, to leave bridging tape 13 attached to the anchor sheets since there will be normally sufficient attachment of the carpet to the anchor sheet in a large area underneath hook cover 9. It is not necessary to attach the anchor sheets to the underlying floor substrate in every situation. The overlying carpet (not shown in FIGS. 1, 2 or 3) will provide additional mass and rigidity to the anchor sheets which will be firmly attached to each other by such overlying carpet. In this case, depending upon the mass of the carpet and the rigidity of the anchor sheets, the combination may be firmly enough attached in place by the surrounding boundaries of the walls or other perimeter of the room or area in which the anchor sheet and carpet have been installed.

In some cases, given a large enough carpet area, and depending upon the underlying floor structure, it may not be necessary even to attach area rugs to the underlying floor since they may have sufficient mass to remain in place without substantial movement on their own. It will also depend, for instance, in the case of both area rugs and wall to wall carpet on whether or not furniture or other heavy objects are installed on the combination carpet and anchor sheet.

Figure 4:
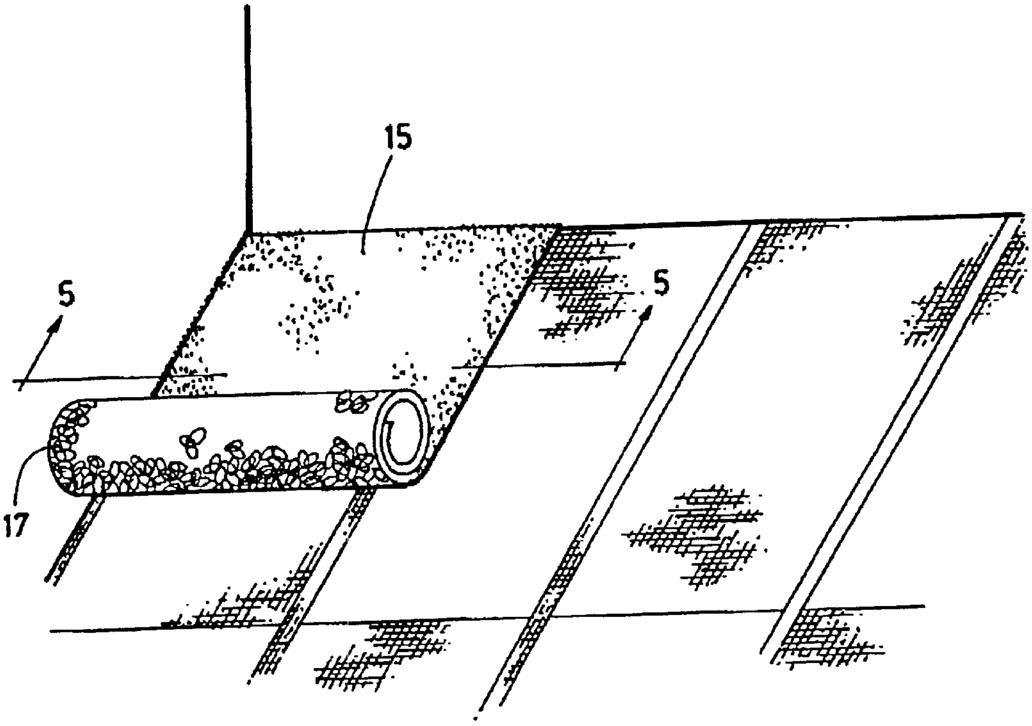
FIG. 4 shows carpeting laid onto the anchor sheeting of FIG. 1.
Figure 5:
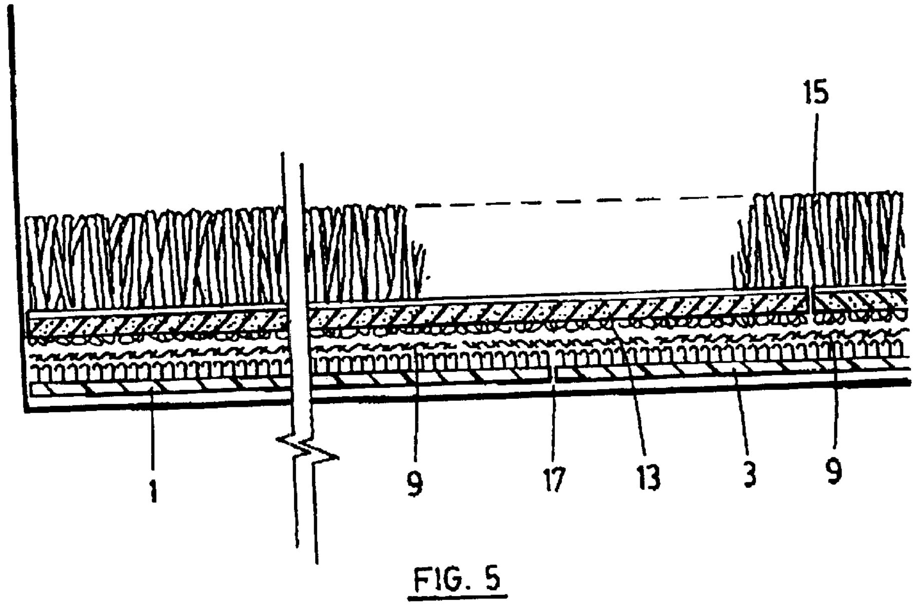
FIG. 5 shows a section along the lines 5—5 of FIG. 4.

In some cases, the abutting anchor sheets as shown in FIG. 1, will be installed under carpets of a wider width than the anchor sheet so that the carpet 15 overlaps the anchor sheet as shown in FIG. 4. Loops 17 on the back of the carpet are engageable with hooks 7 when the cover 9 has been removed. For installation, carpet 15 is rolled out onto the anchor sheets which are entirely covered by a hook covering 9. The carpet can now be cut and fit and adjusted in place and abutted against another carpet roll before any attachment to the underlying anchor sheet 1 is made. In FIG. 5 is shown a cross-section of the anchor sheet and carpet prior to removal of the hook covering 9 or 13. Thus carpet 15 overlaps join 17 between abutting anchor sheets 1 and 3. Anchor sheets 1 and 3 are possibly attached to the floors as previously described and they are also attached to each other by hook covering 13 bridging join 17. Once covering 9 is removed, at least part of anchor sheet 1 and at least part of anchor sheet 3, are now both attached to carpet 15 so that carpet 15 now also bridges the join 17 between anchor sheets 1 and 3 and ties such anchor sheets together. It is possible, and even in some situations preferable, to also remove bridging hook cover 13. However, it is not always necessary to do this. Once at least hook covering 9 is removed, the carpet and anchor sheet whether or not attached to the underlying substrate form a contiguous rigid floor covering of relatively great strength, mass and rigidity which does not buckle under ordinary use even if there has been no attachment directly to the floor.

The anchor sheet itself is preferably made of thin polycarbonate, polyethylene, polypropylene or polyester of preferably from $^{10}/_{1000}$ to $^{20}/_{1000}$ thickness. The thickness may vary depending upon the covering material and the stability requirements for the carpet. It is also possible for the anchor sheet to be made of thin sheet metal, carbon fibres or some form of polymer. The anchor sheet can include a foam layer which provides resiliency. Hooks can be attached to the sheet by any conventional means but extrusion or co-extrusion are the preferred methods.

Figure 6:
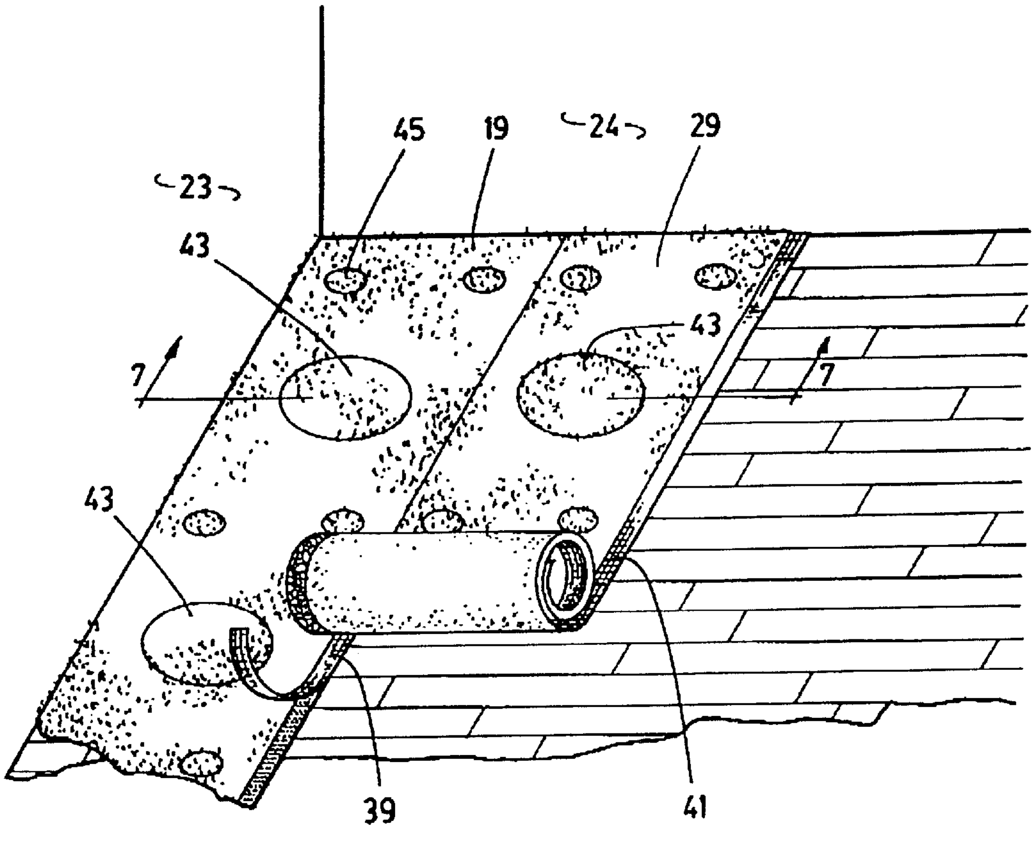
FIG. 6 shows pre-assembled carpeting and anchor sheet together being laid in abutting overlapping relationship onto a floor.

Thus the anchor sheets and carpet together are, in many situations, thin enough and flexible enough to be rolled as a single unit. This enables the carpet, in some embodiments, to be pre-installed onto the anchor sheet in which case it can be more easily installed as shown in FIG. 6.

Figure 7:
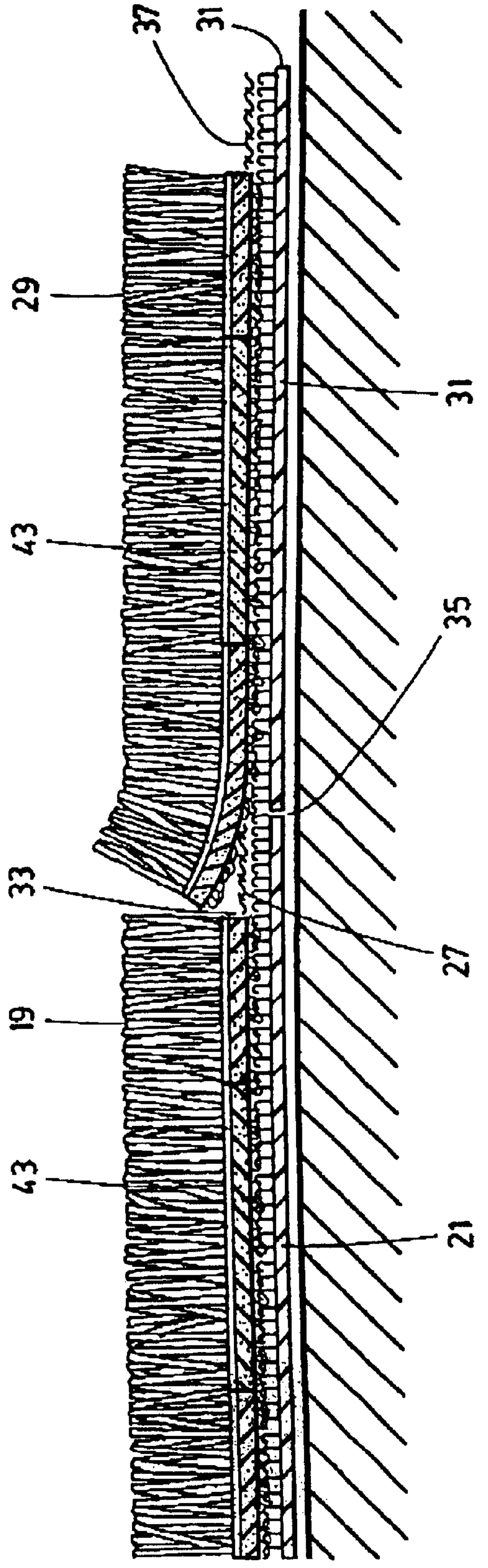
FIG. 7 shows a section along the lines 7—7 in FIG. 6.

In this case, carpet 19 installed on anchor sheet 21 (as seen in FIG. 7) is rolled onto the floor and cut to fit adjoining walls 23 and 24.

Carpet piece 19 and anchor sheet 21 is delivered to the site in the same form as carpet piece 29 and anchor 31 but in the case of the part which abuts wall 23, the extra carpet may be trimmed off or left as it is not a necessity that the anchor sheet abut the wall.

It has come pre-installed (as can better be seen in FIG. 7) onto anchor sheet 21 which is, in this case, bigger than carpet piece 19 so as to leave exposed an area of hooks 25 covered with a hook covering 27. Most carpet rolled in this way will be installed on an anchor sheet at a factory with an overlap a shown for carpet piece 29 so that the carpet overlaps on one side of the anchor sheet 31 and on another side the anchor sheet 31 itself extends beyond carpet piece 29. Carpet and anchor sheet combination 29 and 31 are then unrolled to abut carpet piece 19 and can be cut and fit in place after which hook covering 27 can be removed by pulling the hook covering up thereby rolling back carpet piece 29 or in some cases by pulling the covering 27 up and through join 33. Carpet piece 29 is now firmly attached to both anchor sheet 21 and 31 and, as it bridges the join 35 between the two of them attaches the two anchor sheets together. It is now possible to repeat this process by laying an additional similar carpet roll over hook covering 37 and remove such hook covering to attach the next adjoining carpet piece to anchor sheet 31 and to repeat this process again and again until the room is covered in carpet and anchor sheet in a continuing piece.

If it is necessary to attach the anchor sheets to the floor, it can be done in the area exposed where the anchor sheet hooks and hook covering are not covered by the pre-installed carpet roll such as at 39 or 41. In this case the hook covering 27 or 37 can have perforations, slits or holes so that a nail or tack attached through the hook covering will not attach the hook covering to the underlying anchor sheet so that it can be removed as previously described. Attachment of the anchor sheet to the floor at for instance strips 39 and 41 should be sufficient attachment in many, if not most, instances, especially when combined with the fact that the decorative carpet covering also ties the anchor sheets together as a single unit.

There is an advantage in some situations to install the carpet over an anchor sheet in a factory. The factory can-cut and fit a number of different carpet pieces onto the anchor sheet, both for decorative purposes and for transportation of the carpet pieces together as one piece. Thus as shown in FIG. 6 it is possible to have an insert, for instance 43, repeated with a decoration or pattern at intervals on the carpet roll and with smaller geometrical inserts 45. Typically these inserts would be of a different colour or different design or pattern to create a pleasing carpet pattern.

Figure 8:
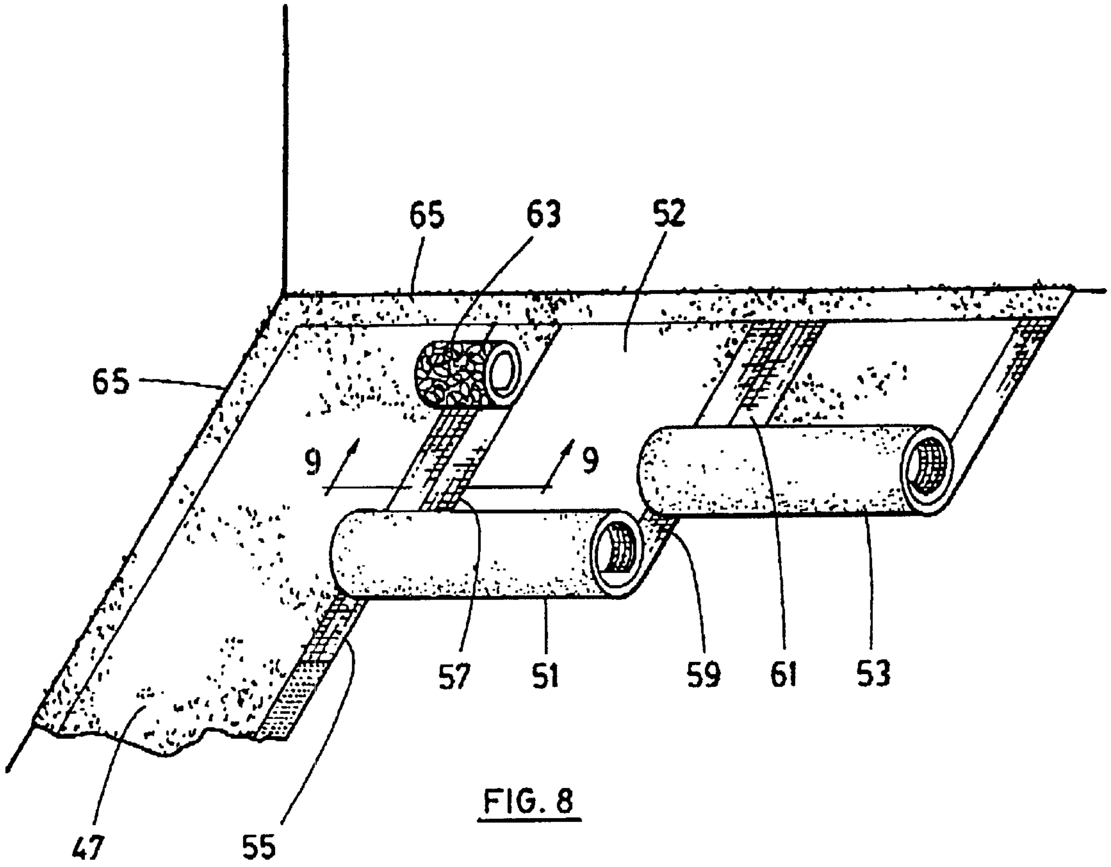
FIG. 8 shows an alternative embodiment with a separate carpet piece bridging abutting anchor sheets.
Figure 9:
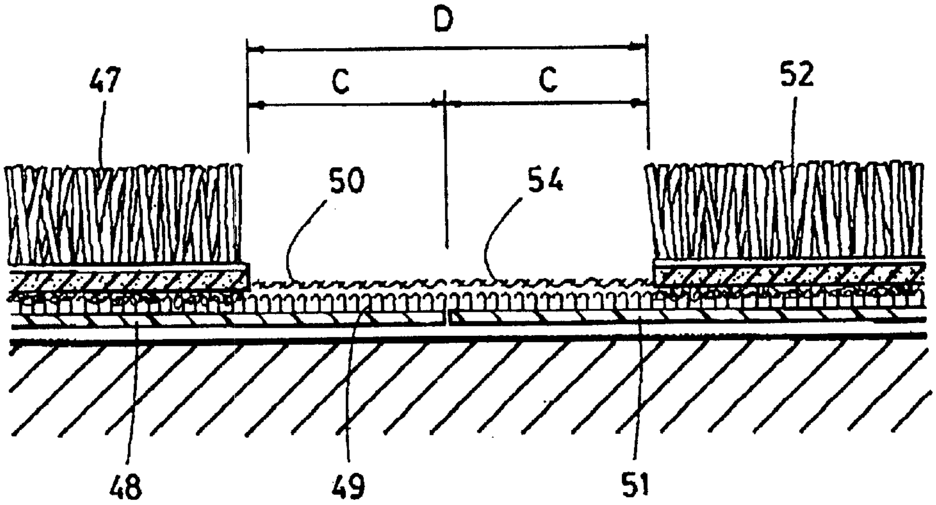
FIG. 9 is a section along the lines 9—9 of FIG. 8.

FIGS. 8 and 9 show an additional form of carpet installation. In this case the carpet and anchor sheet will be delivered from the factory attached but the carpet, for instance 47, is narrower than the anchor sheet 48 to leave an exposed area of anchor sheet hook 49 and hook covering 50 of approximately width C as shown in FIG. 9 on both longitudinal edges. In this case, the carpet is unrolled and, if desired, attached to the underlying floor. Another similar anchor sheet 51, having installed thereon carpet 52 is unrolled and abutted to anchor sheet 48 (seen in FIG. 9). Anchor sheet 53 is also unrolled and abutted to anchor sheet 51. Anchor sheets can be attached to the floor by, for instance, nailing through strip areas 55, 57, 59 and 61 since at this stage of the installation, those areas do not contain a carpet covering. Bridging carpet strip 63 can be fit to the area not covered by carpet 55 and 57 (the area labelled D in FIG. 9). After fitting, underlying hook coverings 50 and 54 can be removed so that carpet piece 63 can be installed on the anchor sheet to bridge and firmly attach anchor sheet 48 to anchor sheet 51. A similar process can then be followed for anchor sheet 53.

Normally this form of installation would be used where it is desired to have carpet strip 63 of a different colour or pattern than carpet pieces 47 and 52 so as to provide a decorative border around individual carpet areas 47 and 52 51. In this case, it is likely that the pattern or border will also be contained along edges 65 and this can be easily accommodated by installing carpet piece 47 of a size smaller than the anchor sheet 48 to create strip 65 of any desired thickness. This form of installation may also allow for room variations since the carpet trim at the border is installed and trimmed last.

Again it is possible for anchor sheets 48 and 51 to be attached to the floor either by tacking or nailing or also by a complementary hook and loop attachment system, or (although it is usually not preferable) by gluing or pressure sensitive double-sided tape.

Figure 10:
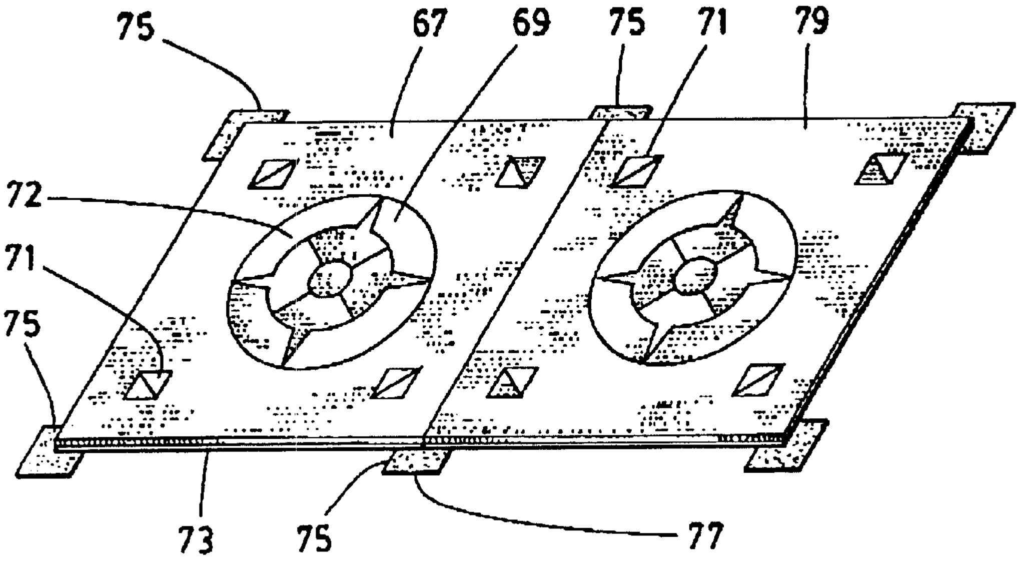
FIG. 10 shows another arrangement of anchor sheet and carpet with a decorative pattern.
Figure 11:
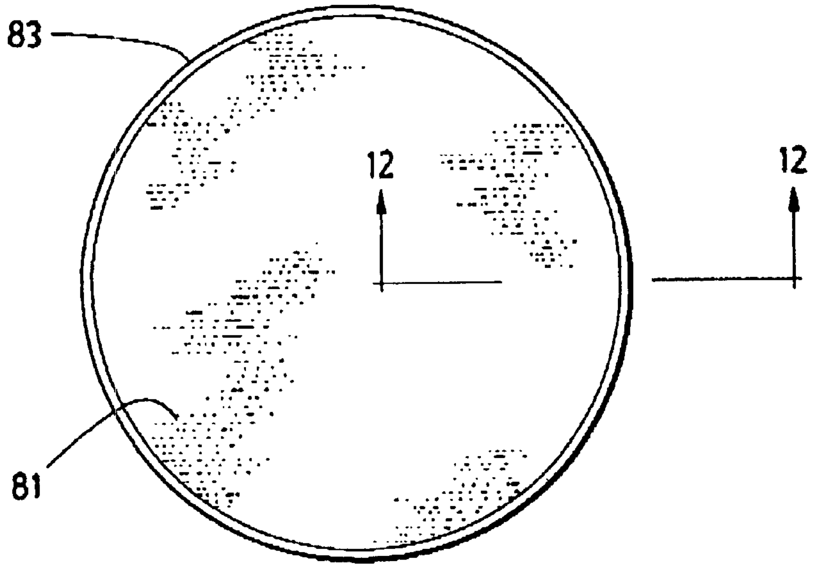
FIG. 11 shows an area rug installed on an anchor sheet having a lip.
Figure 19:
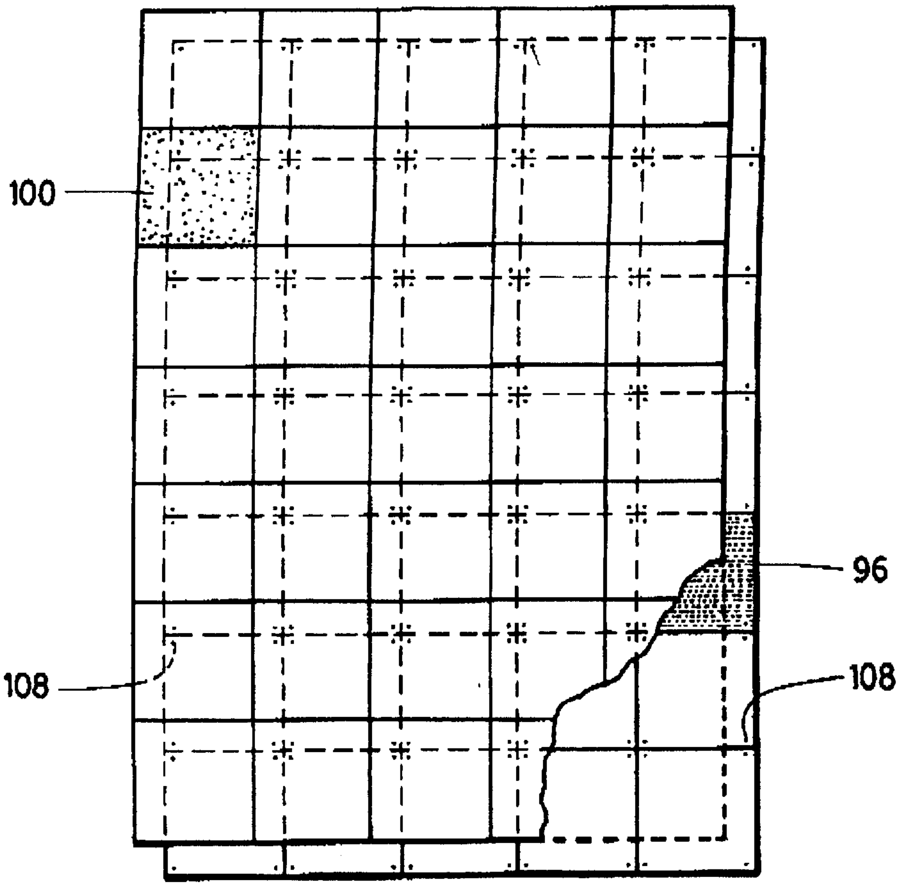
FIG. 19 shows a portion of a finished modular surface covering.

In FIG. 10 is shown another form of pattern 67 containing a central medallion 69 and corner pieces 71 installed on an anchor sheet 73. In this case the anchor sheets and carpet pieces simply abut and are attached to the floor by small pieces of hook tape 75 which will normally have hook covering (not shown), hooks on an upper surface and a pressure sensitive adhesive 77 on a lower surface for attachment to the floor. The pressure sensitive adhesive will normally have a peelable dry strippable covering. In this case the carpet 67 and anchor sheet 73 can be attached by individual pieces 75 at the corners which can overlap with the adjoining carpet pieces. Strips could also be used along joins between for instance carpet pieces 67 and 79, but if a number of pieces is to be used, normally an overlapping modular system such as shown in FIG. 19 would be used, since this assists in holding seams in place and assists with gauge differential problems that might exist between different carpets which could cause seam abuse. If a modular system is used attachment points to the underlying floor may not be required.

This same pattern could be used as described later, without attachment to the floor by overlapping piece 79 for instance onto adjoining anchor board 73. In this case, of course, piece 67 must be made shorter.

One advantage of the anchor sheet system is that carpet inserts 69 and 71 can be removed, replaced, or exchanged if different colours or patterns are desired and similarly as shown in FIG. 6 inserts 43 and pieces 45 can also be removed and changed. Any pattern can be inserted, and if standard sizes are used, the patterns can be interchangeable so as to convert the carpet piece from for instance a boy's pattern to a girl's pattern or from a living room pattern to a bedroom or bathroom pattern.

Another prime advantage is that the anchor sheet need only be attached at a discrete corner area such as with pad 75 shown in FIG. 10 but, nevertheless, carpet pieces 67, 69, 71 and 72, for instance, are all attached across their entire undersurface on the anchor sheet 73 so that a pattern can be inserted or replaced at any point.

Figure 12:
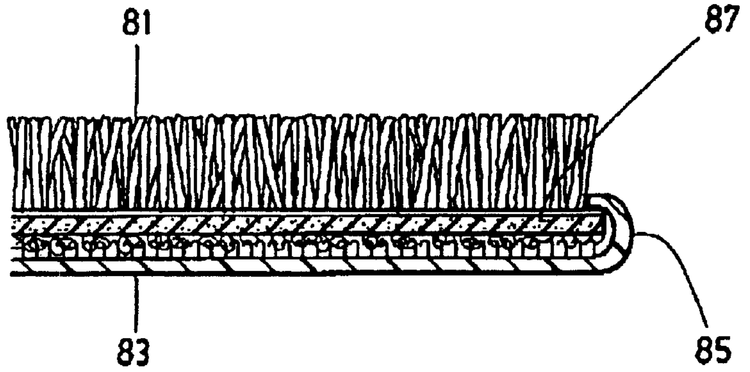
FIG. 12 is a section along the lines 11—11 of FIG. 12.

As shown in FIG. 12, an area rug can also be created in which carpet piece 81 is installed over anchor sheet 83 as best seen in FIG. 12. Anchor sheet 83 has upturned or curled lip 85 which covers the exposed edges 87 of the carpet.

An anchor sheet for such area carpet can be attached by nails or by hook and loop technology (if the underside of the anchor sheet is covered in loops and is then installed with corresponding hooked tape). In most cases it would be sufficient to simply attach the anchor sheet at discrete points to the underlying floor by a small piece of loop tape attached by pressure sensitive adhesive to the underside of the anchor sheet 83 matched to a corresponding small piece of hook tape attached by pressure sensitive adhesive to the floor. In some cases the area carpet may have sufficient mass and stability not to have to be attached to the underlying floor at all. The need for attachment is reduced if, for instance, anchor sheet 83 has a non-slip surface on its underside. With the anchor sheet disclosed it is possible to attach area rugs to granite, marble or stone, floors to which it has been difficult to apply area rugs in the past. In addition, carpet 81 can, like carpets 67 and 19, have inserted patterns and those patterns can be quite elaborate allowing, for the first time, a relatively cheap patterned rug which can mimic even, for instance, oriental carpets, in which a large number of carpet pieces are installed over a unitary anchor sheet 83. It is even possible to create a crazy quilt or a do-it-yourself carpet using carpet pieces installed over a pre-formed anchor sheet 83.

Figure 13:
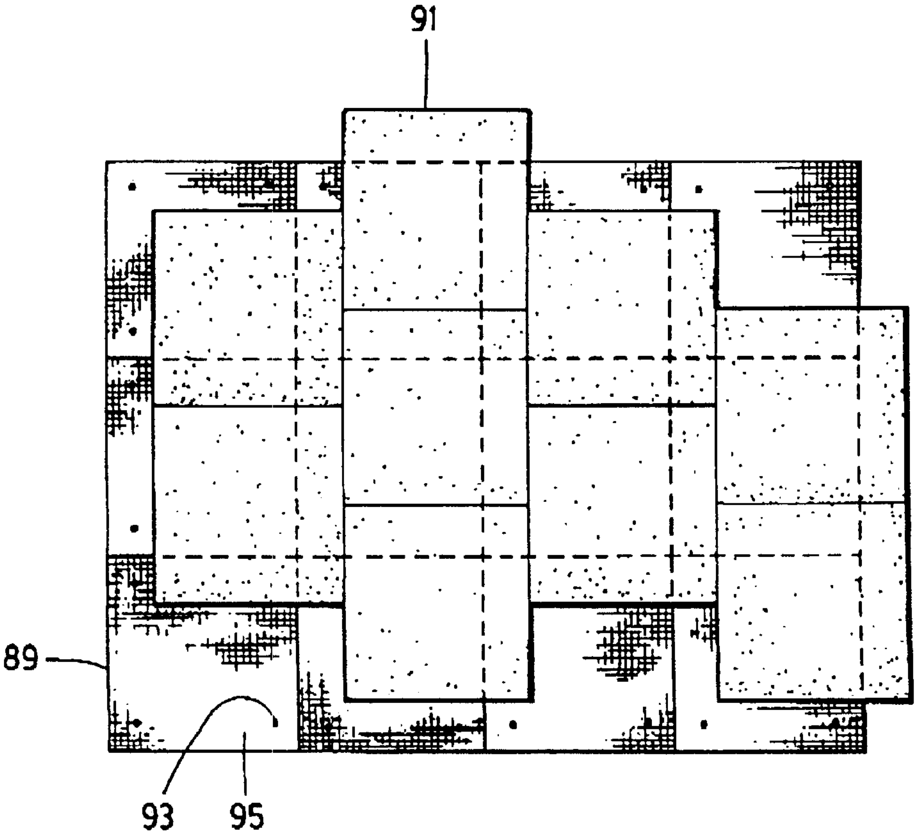
FIG. 13 is yet another embodiment of anchor sheet and overlying decorative covering pieces which has not been created from modular units.

As shown in FIG. 13, anchor sheets 89 can be made in smaller modules. Decorative covering such as carpet pieces 91, can be, for instance, carpettiles, and if they are laid in overlapping relationship as shown in FIG. 13, a contiguous mass can be formed by anchor sheets 89 and carpet pieces 91, which would be sufficient to provide for stable installation without attachment to a floor. This would particularly be the case if piece 91 is not carpet but parquet or another rigid decorative covering. If however it is desired to attach the anchor sheets 89 to the floor, that can be easily done by tacking or nailing, or using conventional hook and loop technology. In this case again it would be preferable to have slits, perforations or holes 93 in the tape covering 95 (if tape covering is used) so that the anchor sheet can be attached to the floor before removal of any hook covering, but without the attachment of the hook covering to the floor.

Figure 13A:
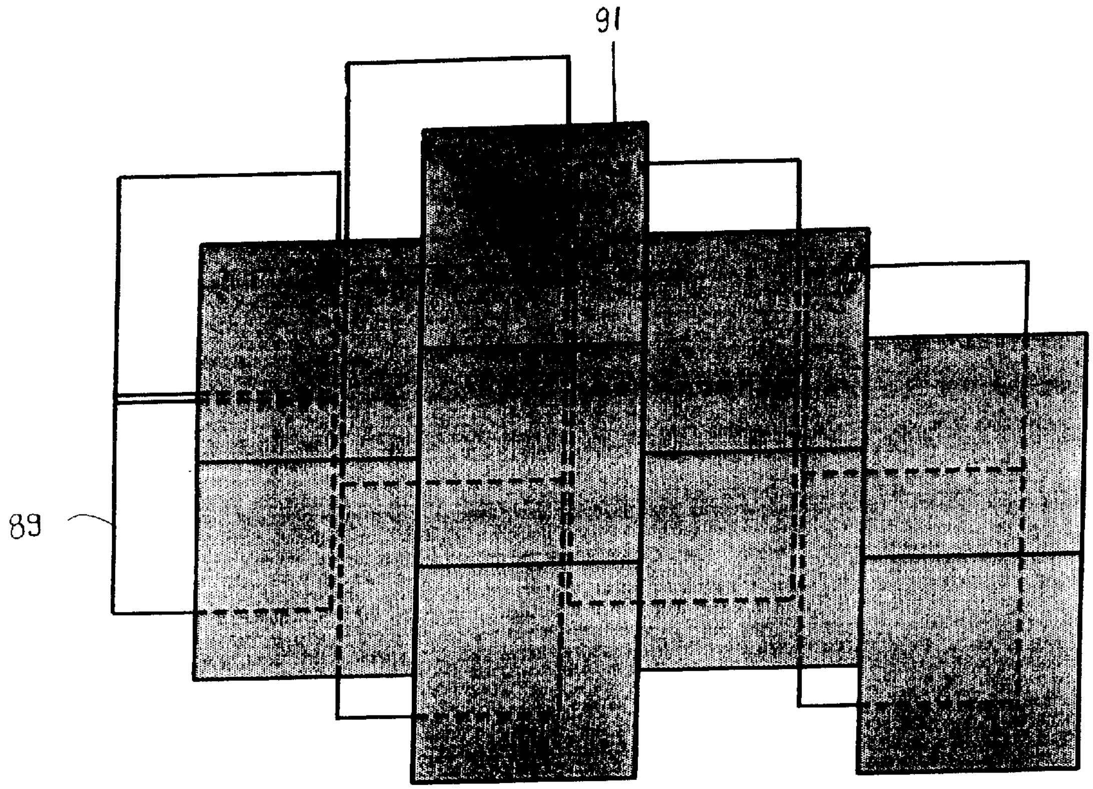
FIG. 13*a* is yet another embodiment of anchor sheet and overlying decorative covering pieces pre-assembled as individual modular units and laid in an abutting and overlapping fashion.

In FIG. 13*a* is shown a similar arrangement to FIG. 13, but in which the pattern is built in a modular way so that, for instance, units of a covering 91 and an anchor sheet 89 can be created before assembling the entire surface covering. A form of such units, which we call covering modules, is described below.

Figure 14:
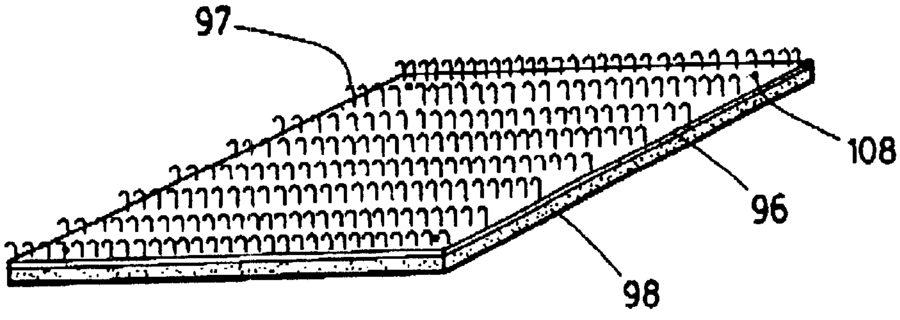
FIG. 14 shows an anchor sheet having an upper surface substantially covered with hooks and an optional cushion on the underside of the anchor sheet.
Figure 15:
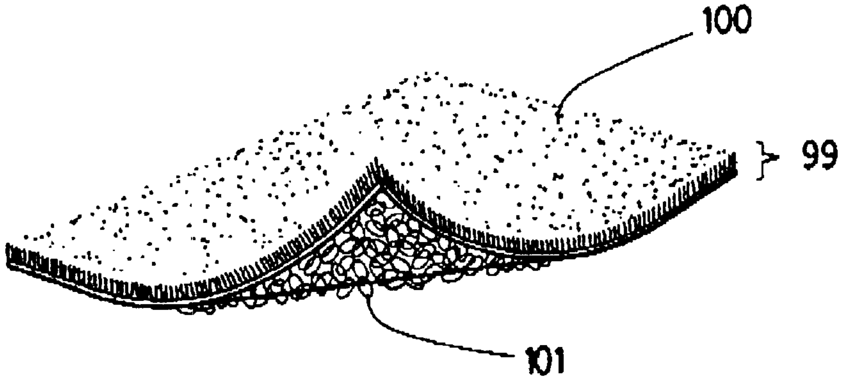
FIG. 15 shows a decorative covering module having a decorative finished upper surface and an underside substantially covered with loops.
Figure 16:
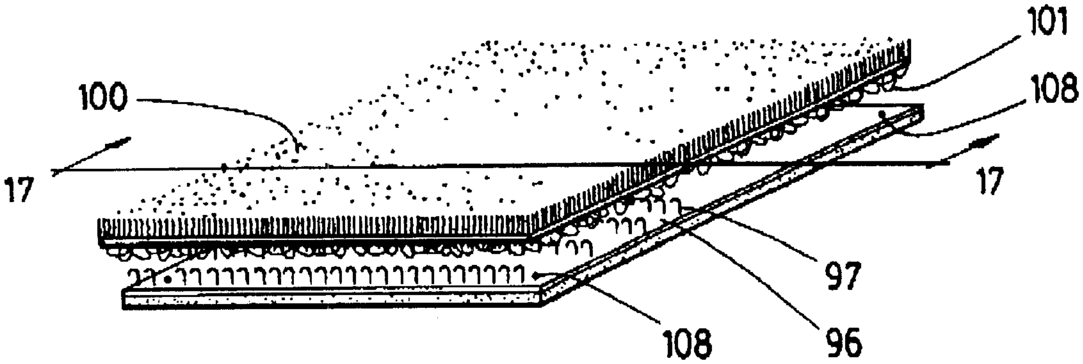
FIG. 16 shows one covering module of a modular surface covering having a decorative covering detachably precision attached in an overlapping manner to an anchor sheet by means of hook and loop technology.
Figure 17:
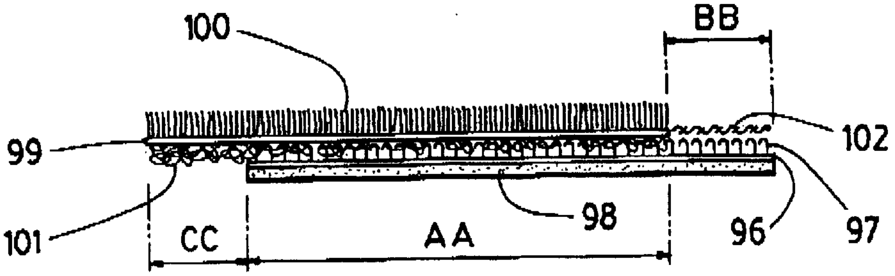
FIG. 17 shows a section along lines 17—17 of FIG. 16.
Figure 18:
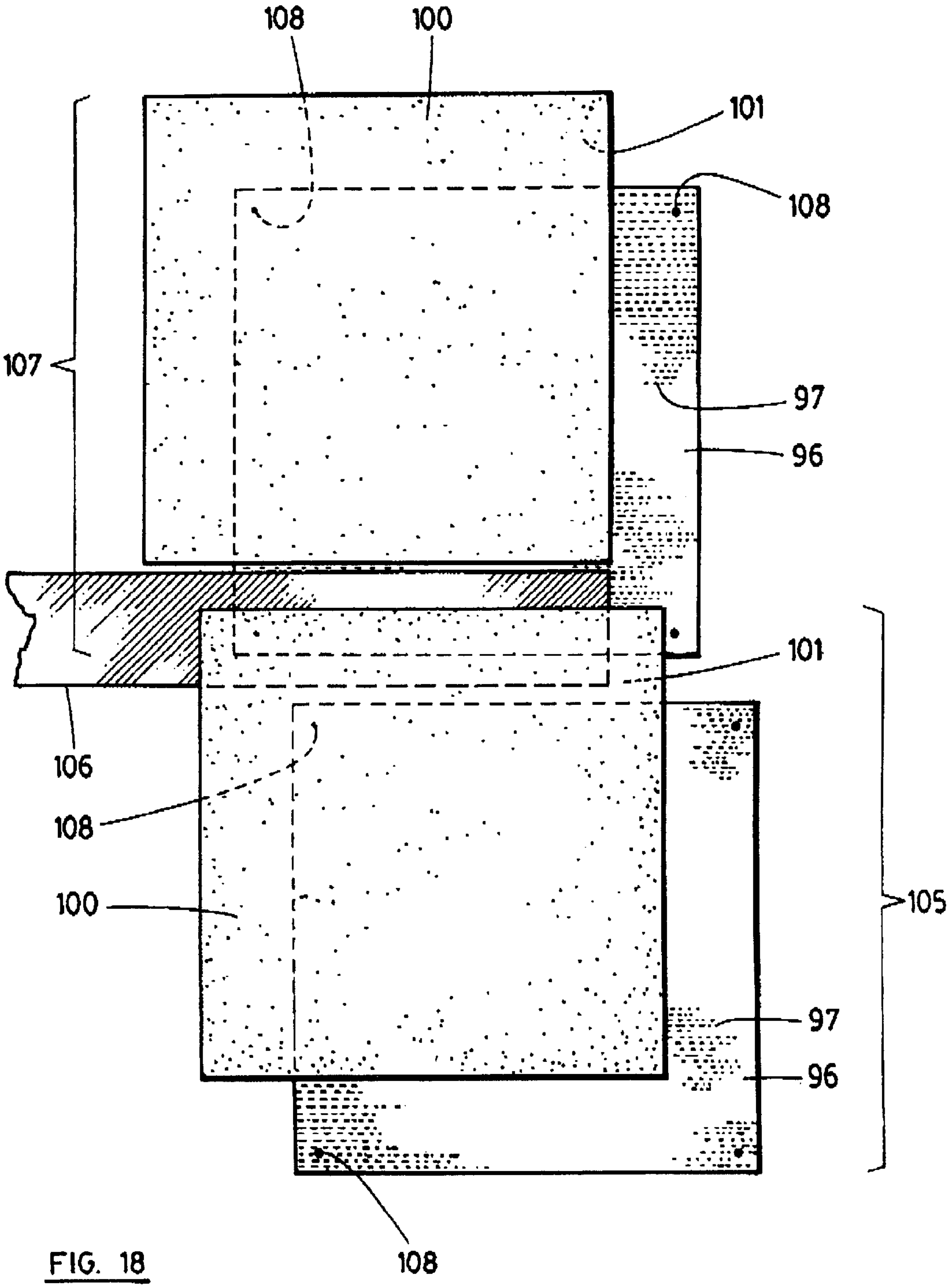
FIG. 18 shows two pre-assembled covering modules being laid in an abutting overlapping relationship onto an underlying substrate.
Figure 18A:
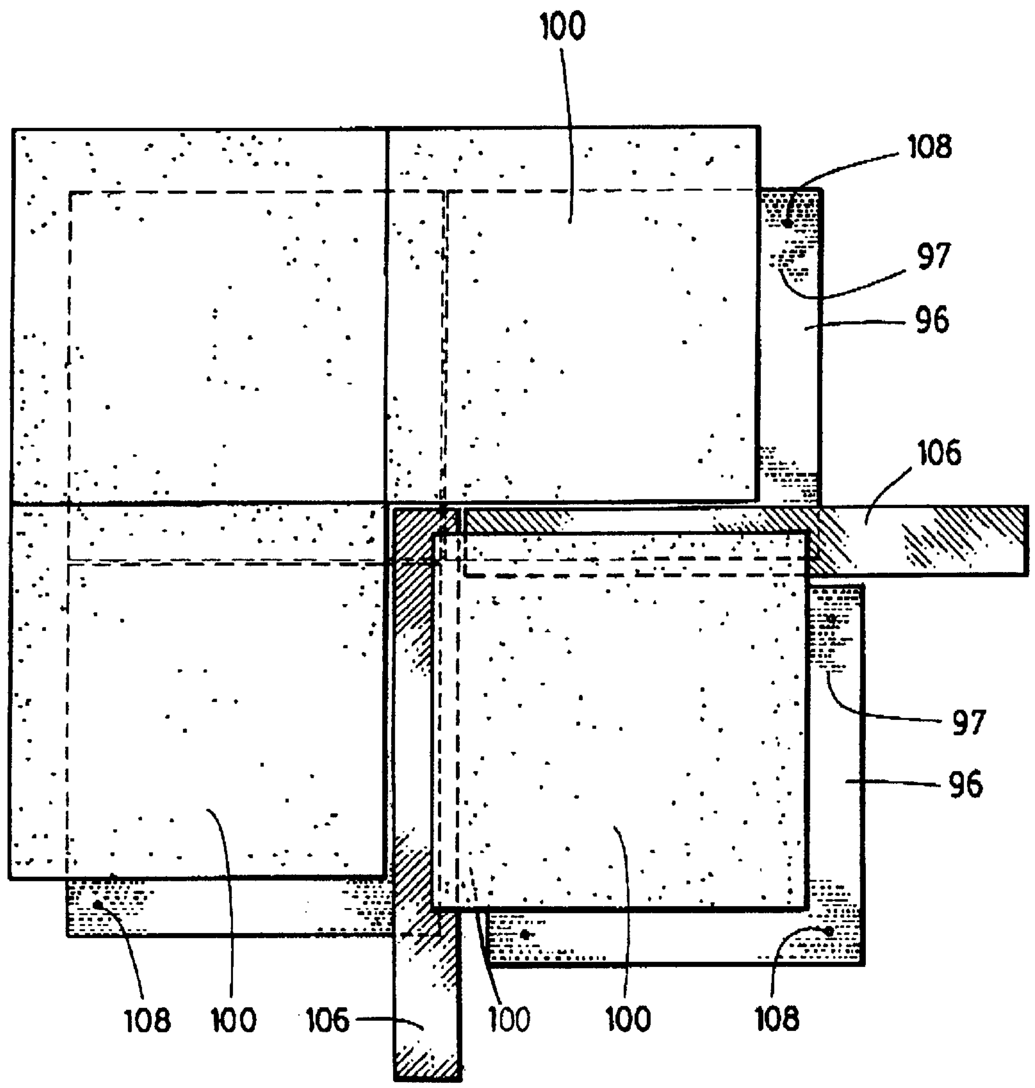
FIG. 18*a* shows three pre-assembled covering modules laid in an abutting overlapping relationship on an underlying substrate and a fourth covering module being installed.

As shown in FIGS. 14 and 15, in an additional form of installation, covering modules comprising an anchor sheet 96 having an upper surface covered substantially with hooks 97, with an optional cushion on its lower surface 98 and a decorative covering 99 for placement over the anchor sheet having a decorative finished upper surface 100 and a lower surface substantially covered with loops 101 are detachably preattached off site in an overlapping manner along surface AA as shown in FIG. 17 such that an area of hooks are left exposed BB while some of the loops on the underside of the decorative covering are also left exposed CC. Covering pieces 102, preferably of cloth can cover the hooks 97, but are not necessary where temporary coverings 106 as seen in FIGS. 18 and 18*a* are used. It might be advisable to use covering pieces to prevent dirt from covering the hooked surface before assembly.

Figure 20:
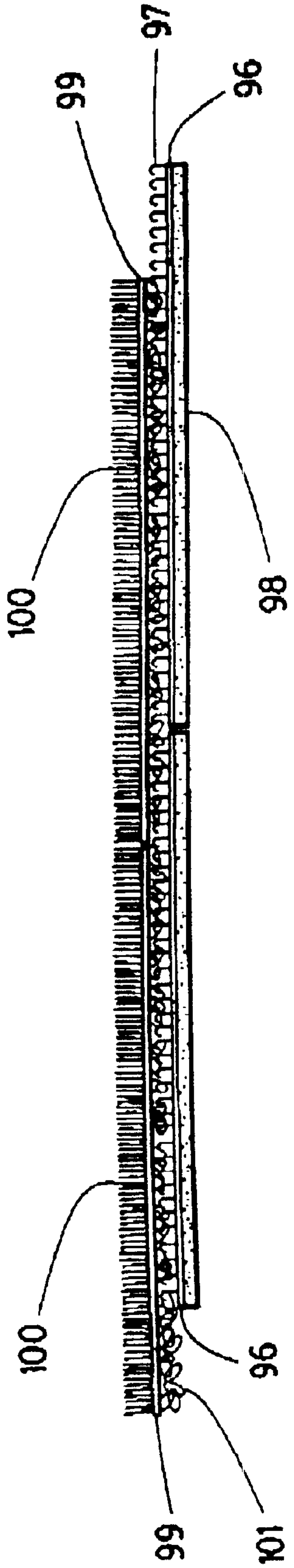
FIG. 20 shows a section of two covering modules attached together.
Figure 21:
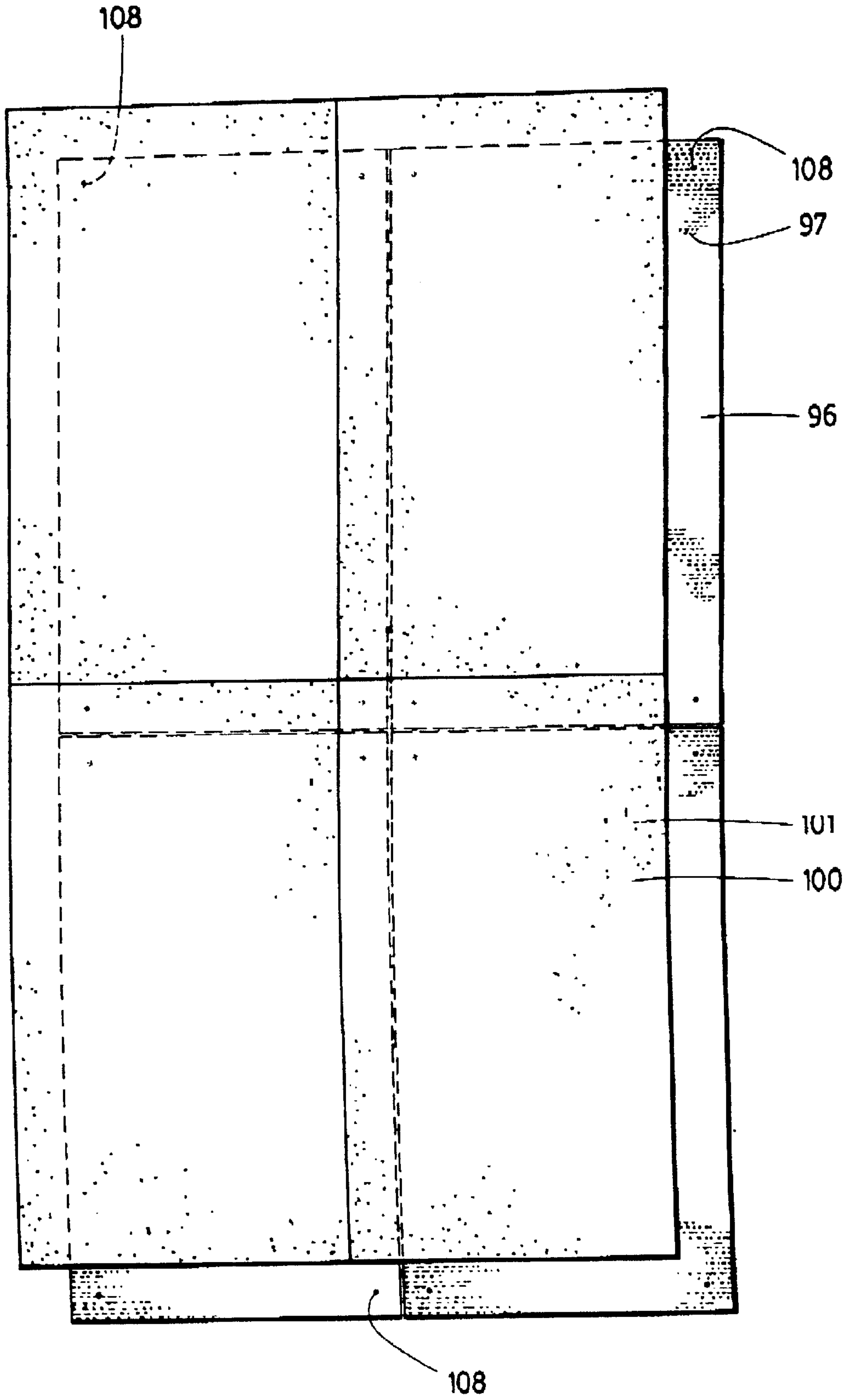
FIG. 21 shows another arrangement of the modular surface covering composed of covering modules of a rectangular size and shape.

These pre-assembled covering modules are then shipped to the site and as shown in FIGS. 18 and 18*a*, placed on the underlying substrate individually, in an abutting fashion, in order to engage the exposed loops 101 on the underside of the decorative covering of one covering module and the exposed hooks 97 on the upper surface of the anchor sheet of an adjacent covering module. As shown in FIG. 18, each covering module 105 added to the growing modular surface covering is guided into its proper position by laying thin, rigid pieces of plastic 106, over the exposed hooks of the anchor sheet of the established covering module 107. The rigid pieces of plastic permit placement and adjustment of the unit without premature engagement of hooks and loops during installation. After properly aligning the loops on the underside of the decorative covering of one covering module with the hooks on the upper surface of the anchor sheet of the abutting covering module, the thin, rigid pieces of plastic are slid out parallel to the horizontal plane and away from the two units thereby enabling the abutting units to become engaged through hook and loop technology. Any hook covering pieces (not shown) of the recently added covering module are then removed in preparation for the addition of a subsequent covering module. This step by step process of attaching covering units to adjacent covering units mechanically bonded through hook and loop technology is repeated to create a contiguous surface covering as shown in FIG. 19. FIG. 20 shows a section of two covering modules attached together.

A disadvantage of using covering modules is the difficulty of aligning them over a great distance. The anchor sheet should preferably be precisely located in relation to the neighbouring anchor sheet and the decorative covering should preferably be precisely located in relation to the decorative covering of a neighbouring covering module. If the length AA, BB or CC (as shown in FIG. 17) is off by even a small amount, this amount multiplied over many modules will result in a misalignment of the surface covering. Thus unless the anchor sheet and the decorative covering are precisely aligned on the covering module, it will not be possible in practice to easily install an overlapping system, such as disclosed here. In practice, it is necessary to have these modules preattached in a precise relationship as shown in FIG. 17, preferably by preassemibly at a factory using a machine for accurate alignment. It is also possible but slow to use a pattern or form at the point of installation for maintaining a constant alignment of the decorative covering with the anchor sheet.

One advantage of this form of installation is that an unlimited variety of patterns can be created. Decorative coverings or the entire covering module can be removed, replaced or exchanged if different colour or pattern combinations are desired. Any pattern can be inserted and if standard sizes are used, patterns can be interchangeable. For example, units of different coloured carpet can be installed to create a unique carpet design or a combination of different types of covering modules, such as carpet and hardwood or ceramic and marble can be combined and subsequently replaced or exchanged to form yet other unique arrangements.

To facilitate this process, the thin, rigid pieces of plastic discussed above can also be used to detach individual units of the modular surface covering. The thin, rigid pieces of plastic are inserted between the mechanically bonded portions of the hook and loop fastener of abutting units, parallel to the horizontal plane, thereby breaking the mechanical bond and maintaining the hooks and loops out of contact with one another to enable the units to be dislodged and removed from the modular surface covering.

Another advantage is that in most cases, the mass of the decorative covering and the rigidity of the anchor sheet when attached together will enable the modular surface covering resulting from the hook and loop attachment of abutting covering modules, to abutting anchor sheets to be held firmly in place without the need for attachment to the underlying substrate. However, if it is necessary to attach selected covering modules to the substrate, as for example, with a wall covering, that can be done by tacking, nailing, gluing or by use of hook and loop technology. The exposed portion of the anchor sheet of a covering module yet to be bonded through hook and loop technology to a subsequently added abutting module can be used for tacking to the underlying substrate. Such exposed portion is then covered by a decorative covering of an abutting covering module. Such discrete tacking points could be as shown at 108 in FIGS. 16, 18, 19 and 21. Attachment of the anchor to the substrate at points 108 or even fewer points should be sufficient attachment in many, if not most, instances. Depending on the thickness or brittleness of the anchor sheets, it may be advisable to have predrilled holes in the anchor sheets. In this case again it would be preferable to have slits, perforations or holes (not shown) in the tape covering (not shown) so that the anchor sheet can be attached to the floor before removal of any hook covering, but without the attachment of the hook covering to the floor.

Figure 22:
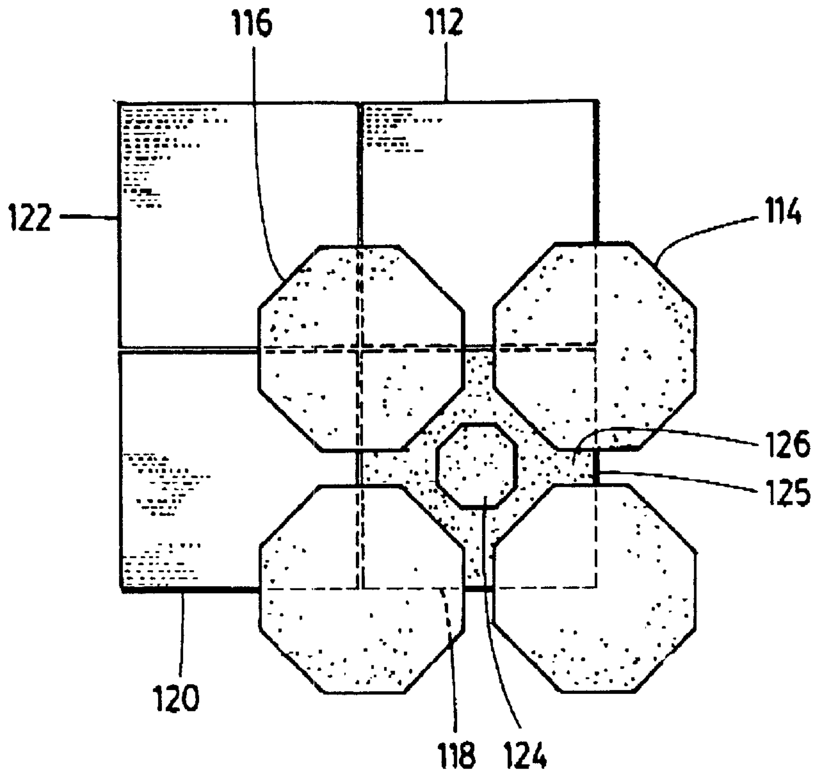
FIG. 22 shows another arrangement of the modular surface covering representing a decorative pattern with artificial grout separating carpet tiles.
Figure 23:
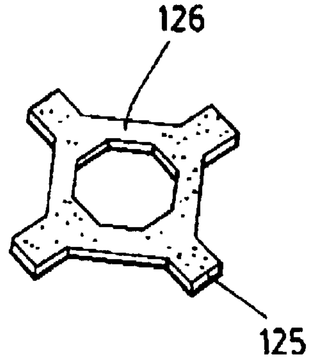
FIG. 23 shows a decorative pattern separator for use in the arrangement of FIG. 22.
Figure 24:
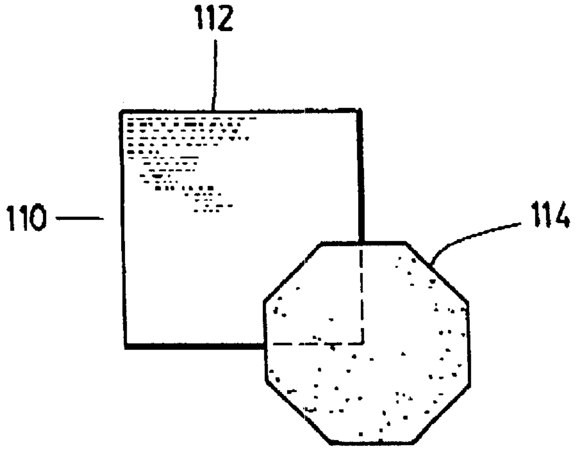
FIG. 24 shows one way in which the covering modules assembled as shown in FIG. 22 may be delivered on site.

Shown in FIGS. 22, 23, and 24 is an additional carpet or ceramic tile pattern using covering modules 110 such as shown in FIG. 24. Such covering modules consist of an anchor sheet 112 and a tile or decorative covering 114 which can be of ceramic or carpet or any other suitable material. Normally the tile or decorative covering 114 and anchor sheet 112 are pre-attached at a factory in a precisely predetermined relationship as shown. If the tile or decorative covering contains loops across its undersurface and the anchor sheet hooks across its top surface, then detachment and reattachment are possible if required on site. A permanent adhesive can be used for a permanent bond between tile 114 and anchor sheet 112 or a temporary adhesive having the properties of hook and loop (i.e. can be attached and reattached and good horizontal strength) can be used.

Assuming hook and loop is used, then the anchor sheet 112 will be covered in hooks similar to hooks 97 in FIGS. 14 and 18 and, the underside of the tile will be covered in loops similar to loops 101 in FIGS. 15 and 17. Tile or decorative covering such as 116 in FIG. 22 overlaps and binds to anchor sheets 112, 118, 120 and 122 and helps to tie those anchor sheets together. If the tile is carpet tile, then tiles such as 114, 116 and others including centre tile 124 can be formed by dye cutting of a larger carpet piece. In this case "grout" shaped spacing pieces 126 as shown in FIG. 23 are formed. If other carpets of contrasting colours are also cut, these pieces can be used with other similarly shaped patterns cut from such carpets. This piece 126, if it came from the carpet used to make tile 114 or 124 would go off for use in another pattern and a new piece (not shown) of the same shape as piece 126 would be included (from a dye cutting of a carpet of a contrasting colour).

Figure 25:
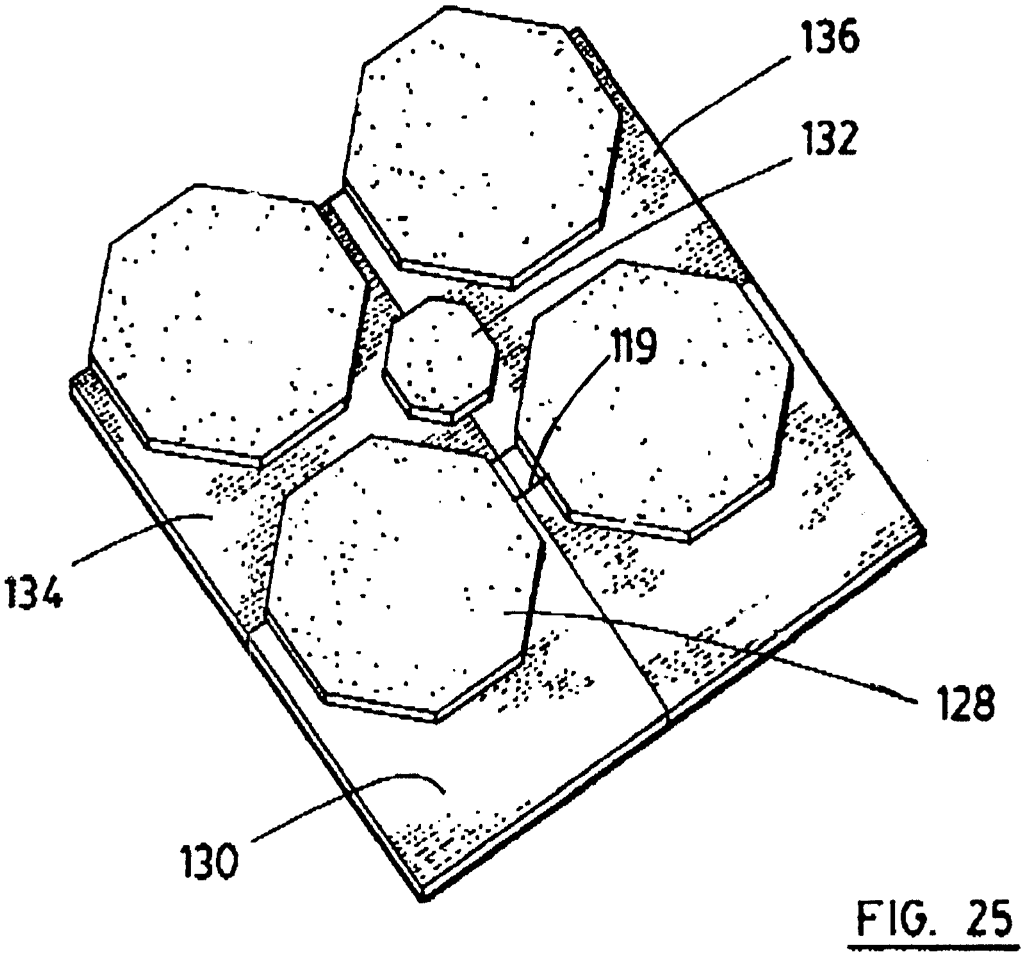
FIG. 25 shows another arrangement of covering modules as an alternative to the arrangement shown in FIG. 22.

By using such decorative pattern separators, such as 126, the places where similar colours meet can be minimized. By providing a contrasting colour for piece 126, the eye is drawn to the pattern rather than any imperfections where straight lines of similar but not identical dye lots meet. Thus in the pattern of FIG. 22 or 25, similar colours meet only at, for instance, 125 in FIG. 23 or 119 in FIG. 25. It is possible to provide a third or even more colours to eliminate places where the same colours meet, which could provide difficulty for subsequent matching. Shown in FIG. 25 is another arrangement in which, for instance, tile 128 is placed on anchor sheet 134. The pattern is similar but the tile or decorative covering is in a different orientation to anchor sheet 134. In this case tile 128 for instance overlaps anchor sheet 130 and 134, but anchor sheet 134 and 136 are attached by medallion 132 and also by an insert or "grout" 126 as shown in FIG. 23, which has not yet been installed in the arrangement of FIG. 25.

In the case where tiles such as 114 or 128 are ceramic tiles, it is possible to size them in relation to the anchor sheet so that the space between, for instance, tiles 114, 116 and medallion 124 is less than shown in FIG. 22, and then a resilient grout, such as rubber caulking, could be friction fit into the space between the tiles to simulate real grout or the rubber caulking could be provided as an elastic band of a size to fit around tile 114 or medallion 124. Such elastic band could even be preinstalled onto the tile before the covering modules such as 110 are assembled. Additionally even real grout could be used directly into the space between the tiles.

The anchor sheet of this invention in its various embodiments allows for increased versatility in the installation of decorative coverings or carpets that have been created with loops such as the hook and loop system disclosed in Pacione U.S. Pat. No. 4,822,658. Using the covering modules, in which the decorative covering and anchor sheet are pre-attached, it is possible to reduce the attachment area to an exposed overlapping area and to use an adhesive which can be pulled apart and re-attached or hook and loop in such exposed area. With the anchor sheet, carpets and other decorative covering can be installed easily on almost any surface without destroying the surface and they can be, in many instances, pre-assembled at a factory and the carpets or other decorative covering only need to be attached to the underlying surface, if at all, at a few discrete places. This removes the necessity of having to remove underlying substrate such as carpet or hardwood and having to strip adhesives such as glue from the surface. Large quantities of decorative covering such as carpet no longer have to be disposed of as they are simply covered by a new decorative covering. Further, with this invention, it is now possible to maintain a valuable flooring, such as marble, intact for later use, but to temporarily cover such flooring with carpet or tile.

While certain embodiments of the invention have been disclosed, it is intended to cover all variations and combinations of the invention as claimed in the attached claims.

I claim:

1. A covering module to form a finished decorative surface comprising:

at least one decorative covering having an upper decorative surface and an opposite lower surface, a non-decorative anchor sheet having an upper surface, the decorative covering detachably attached across a substantial portion of its lower surface to the non-decorative anchor sheet so that, after attachment of the decorative covering to the anchor sheet, there is provided an overlap area of upper surface of anchor sheet exposed along at least an edge of the module, which overlap area is provided with means for detachable attachment of such module to an adjoining module by attachment to an overlapping exposed area of a lower surface of a decorative covering of an adjoining module.

2. A covering module to form a finished decorative surface comprising:

at least one decorative covering having an upper decorative surface and an opposite lower surface, a non-decorative anchor sheet having an upper surface, the decorative covering detachably attached across a substantial portion of its lower surface to the non-decorative anchor sheet so that, after attachment of the decorative covering to the anchor sheet, there is provided an overlap area of lower surface of the decorative covering exposed along at least an edge of the module, which overlap area is provided with means for detachable attachment of such module to an adjoining module by attachment to an overlap area of an upper surface of an anchor sheet of an adjoining module.

3. A covering module as claimed in claim 1 or 2 in which the means for detachable attachment in the overlap area of anchor sheet and decorative covering are one portion of a complementary hook and loop attachment system substantially covering the overlap area of the anchor sheet to be matched with the complementary second portion of such hook and loop system on the overlap area of an adjoining decorative covering.

4. A covering module as claimed in claim 3 in which there is provided on site a temporary covering to prevent attachment of the decorative covering to the non-decorative anchor sheet until the module and adjoining module are in the desired position relative to each other.

5. The covering module of claim 4 in which the temporary covering is a thin smooth sheet of at least substantially the size of the overlapping area, which cannot bind to either complementary hook or loop portions.

6. A covering module as claimed in claim 5 in which the temporary covering is sufficiently rigid and thin so that it can be pushed between the complementary hook and loop bonds of an overlapped attached decorative covering and anchor sheet to break such bonds in the area of such covering to enable readjustment of a decorative covering in relation to an anchor sheet or one module in relation to another.

7. The covering module of claim 3 in which the lower surface of the anchor sheet is provided with a resilient undercushion.

8. The covering module of claim 3 which is laid onto a floor and is attached to adjacent like modules so as to form a covering of sufficient mass and rigidity to remain in place on a floor without buckling or movement when subject to normal traffic and without attachment to the floor.

9. The covering module of claim 8 in which the lower surface of the anchor sheet is provided with a non-slip covering.

10. A covering module as claimed in claim 1 or 2 in which the decorative covering and non-decorative anchor sheet are precisely dimensioned and attached off site in alignment to provide for a pre-determined overlap area of anchor sheet and decorative covering so that when the anchor sheet of a first module is placed in position next to an adjacent second module the decorative covering of the first module overlaps the second module by a predetermined amount and in a predetermined relation to the decorative covering of the second module.

11. A covering module as claimed in claim 10 in which the decorative covering and the non-decorative anchor sheet are attached by means of a complementary hook and loop attachment system covering the lower surface of the decorative covering and the upper surface of the anchor sheet.

* * * * *